(12) United States Patent
Seneski et al.

(10) Patent No.: US 8,079,022 B2
(45) Date of Patent: Dec. 13, 2011

(54) SIMULATION OF SOFTWARE

(75) Inventors: Mark Seneski, Chestnut Hill, MA (US); Richard Sayde, Carlisle, MA (US); Joshua D. Marantz, Brookline, MA (US); Richard J. Cloutier, Andover, MA (US); Dylan Dobbyn, Boston, MA (US); William E. Neifert, Lexington, MA (US)

(73) Assignee: Carbon Design Systems, Inc., Waltham, MA (US)

( * ) Notice: Subject to any disclaimer, the term of this patent is extended or adjusted under 35 U.S.C. 154(b) by 1226 days.

(21) Appl. No.: 11/810,045

(22) Filed: Jun. 4, 2007

(65) Prior Publication Data

US 2008/0301651 A1  Dec. 4, 2008

(51) Int. Cl.
*G06F 9/44* (2006.01)
(52) U.S. Cl. .................................................. 717/135
(58) Field of Classification Search .................. 717/134, 717/135
See application file for complete search history.

(56) References Cited

U.S. PATENT DOCUMENTS

| | | | | |
|---|---|---|---|---|
| 5,612,891 | A * | 3/1997 | Butts et al. | 326/38 |
| 5,613,062 | A * | 3/1997 | Hasebe et al. | 714/37 |
| 6,625,572 | B1 * | 9/2003 | Zemlyak et al. | 703/19 |
| 7,302,358 | B2 * | 11/2007 | Fritzsche | 702/119 |
| 2003/0135791 | A1 * | 7/2003 | Natvig | 714/38 |
| 2006/0282733 | A1 * | 12/2006 | Whetsel | 714/741 |
| 2008/0306721 | A1 * | 12/2008 | Yang | 703/14 |
| 2009/0228750 | A1 * | 9/2009 | Whetsel | 714/726 |

\* cited by examiner

*Primary Examiner* — Anna Deng
(74) *Attorney, Agent, or Firm* — Goodwin Procter LLP

(57) ABSTRACT

Systems and methods facilitate accurate and rapid simulation of software by periodically saving simulation states and design stimuli for use as a replay model. Divergences from the stored information may be detected during subsequent re-executions, which can in turn be run using the saved stimuli and states.

17 Claims, 5 Drawing Sheets

SIMULATION OF SOFTWARE

FIELD OF THE INVENTION

The invention relates to the field of debugging software. In particular, the invention relates to execution of software using pre-stored object stimuli and states to accelerate the debugging process.

BACKGROUND OF THE INVENTION

When verifying software, it is often necessary to re-run the same or similar simulations numerous times to identify, understand and resolve problems in the software. For large or complex software systems, such as simulation programs, arriving at a point of interest (e.g., the point where a bug manifests itself or is fixed, or where the user wishes to observe the system's performance) may take a significant amount of time. This is especially true when the simulation represents intricate hardware devices with timing requirements that must be modeled accurately.

The degree of accuracy required can cause software simulations of hardware to run slowly, and create significant delays between the start of a simulation and arriving at the point of interest. Even when using simulation hardware, it is not uncommon to encounter differences in speed between the actual electronic device and the simulation by factors on the order of tens of thousands to millions. For large simulations, many software simulators can execute at a rate between 1 Hz and 100 Hz, depending on the simulator and the electronic device being simulated, whereas it is not uncommon for the physical device to run at clock speeds of 500 MHz or more. This means that it could take weeks or even months to simulate one second of the operation of an electronic device. Even a hardware-based simulator, which may execute a simulation at a rate of 1000 Hz to 1 MHz, may still be hundreds or thousands of times slower than the actual device.

Simulations may also be used to debug software. However, debugging software exclusively on a simulator can be problematic. As noted above, running simulations, and hence the debugging process, may be very time consuming. That is, if the problem(s) appear after running the software program on hardware for a significant time such as several minutes or hours, the same problem(s) may not be encountered on a simulator for a translated significant time of hours or days.

Many simulators attempt to overcome this speed limitation by implementing a save-and-restore methodology that allows a complete simulation state to be saved at any point during execution of the simulation. This saved state can then be loaded at a later time to avoid re-execution of the cycles that preceded the saved state. This technique is often used when a long boot process executes prior to the execution or use of other software components. Such methods have a fundamental limitation in that every component in the system (including the software being debugged) must support the state-saving feature. Further, in order to debug a system using this technique, it is necessary to save the system state before the problem occurs. Since a system error may occur long before a problem manifests itself as a visible symptom, however, detecting the correct point in time to save a system state requires non-trivial effort.

Thus, software simulators may execute slowly and may be limited in their ability to exactly replicate hardware functionality. Accordingly, a need exists for the ability to perform detailed software debugging less expensively and faster than current methods, systems and devices allow.

SUMMARY OF THE INVENTION

The present invention provides systems and methods that facilitate accurate and rapid simulation of system software (e.g., firmware) that interacts with a hardware device. More specifically, the invention facilitates the investigation of anomalies in the system software as it interacts with software objects that represent—i.e., simulate—the hardware device. Such anomalies often reveal themselves through successive executions of the hardware simulation, either after modifications to the system software itself, or following changes to the software objects with which it interacts. Embodiments of the invention utilize periodically saved hardware states, design stimuli and design responses to "replay" the software object such that it responds to the same stimuli in the same manner, and to detect instances in which the responses diverge from the stored simulation information. Subsequent interactions (or portions thereof) of the system software with the software object can be run using the saved stimuli, essentially "simulating" execution of the object from certain object states forward, thus allowing the simulation to proceed faster than an actual execution. The simulations can, in some cases, include re-execution of the same software object to facilitate faster debugging, or different software objects that share common code (e.g., a system startup sequence used for multiple devices.)

Design stimuli include any signal which affects the software model of the hardware system regardless of its point of origin. This stimulus may be represented as a transaction, if the software model of the hardware device has a transactional interface; a transition on an input or bidirectional pin; a deposit to an internal net; or a signal originating from within the software model. Design responses may include pin transitions resulting from the design stimuli and may also include the execution of any models embedded within the software model, as well as the updating of internal nets which are visible to the calling system.

In one aspect, the invention provides a method for debugging software which may be system software that interacts with hardware devices and/or software-based simulations thereof. The method involves periodically saving input/output (I/O) information (such as object stimuli and the responses resulting from the processing of the stimuli) and hardware state information during the execution of the software object as it interacts with the system software. The software object is then re-executed (either in the same form or after some alteration to the system software and/or the environment in which it is operating) until a divergence is detected between the saved stimuli and the stimuli presented during the re-execution. The saved I/O information and hardware state information is then used to initiate a subsequent re-execution of the software object starting at an execution point prior to where the divergence was detected.

The I/O information may be saved at a frequency greater than the rate at which the hardware state information is saved. For example, the I/O information may be saved at each execution cycle of the software object corresponding to a clock phase of a software object that simulates a hardware device with which the software interacts, whereas the hardware state information may be saved every n cycles, where n is a configurable number greater than 1.

In some embodiments, the software object includes simulated modules and non-simulated modules which can be executed in parallel with each other. A non-simulated module is a module (such as pre-compiled C code) that does not allow its I/O information or state information to be saved other than at the beginning and end of its execution. The execution of the non-simulated modules can be halted at the point at which the divergence is detected while the simulated modules are re-executed, and when the re-execution reaches the point at which the divergence was detected, the non-simulated modules can be reinstated in parallel with the re-execution of the simulated modules. In this way, processing time is not devoted to re-execution of non-simulated modules.

In the case of system software such as firmware, the software may interact with software objects that simulate a hardware device on which the system software will operate (i.e., firmware). In such cases, the saved I/O information may represent register transfer level pin values of a virtual hardware model representing a hardware device.

In another aspect, the invention provides a system for debugging software that includes both storage and processing capabilities. The storage device stores I/O information (such as software stimuli and outputs resulting from processing the stimuli) and hardware state information, and the processing device is configured to periodically save the I/O information and the hardware state information, detect a divergence between the saved output and output resulting from a re-execution of the software object as it interacts with the system software, and initiate a subsequent re-execution of the software object starting at an execution point prior to where the divergence was detected using the using the saved I/O information and hardware state information.

In another aspect, the invention provides software in computer-readable form for performing the methods described herein.

The foregoing and other objects, features and advantages of the present invention disclosed herein, as well as the invention itself, will be more fully understood from the following description of preferred embodiments and claims, when read together with the accompanying drawings.

BRIEF DESCRIPTION OF THE DRAWINGS

In the drawings, like reference characters generally refer to the same features and steps throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The present invention facilitates the simulation, analysis and debugging of software. In certain implementations, the software being analyzed represents system software such as firmware implemented on hardware devices. Such devices may themselves be modeled as software objects that represent coded descriptions of the electronic devices (e.g., a Verilog RTL description). The system software may, for example, interact with the software objects in order to facilitate development and testing of the system software and its compatibility with the hardware device prior to device availability.

The following terms and corresponding definitions are used herein. A pin means a physical pin of a hardware device that represents an input, output or in-out element. A storage element refers to any element that retains a logical value, even in instances in which certain non-clock inputs change. In a physical hardware device, examples of storage elements include latches and flip-flops. A deposit is a method by which the value of a pin or storage element is changed.

Figure 1:
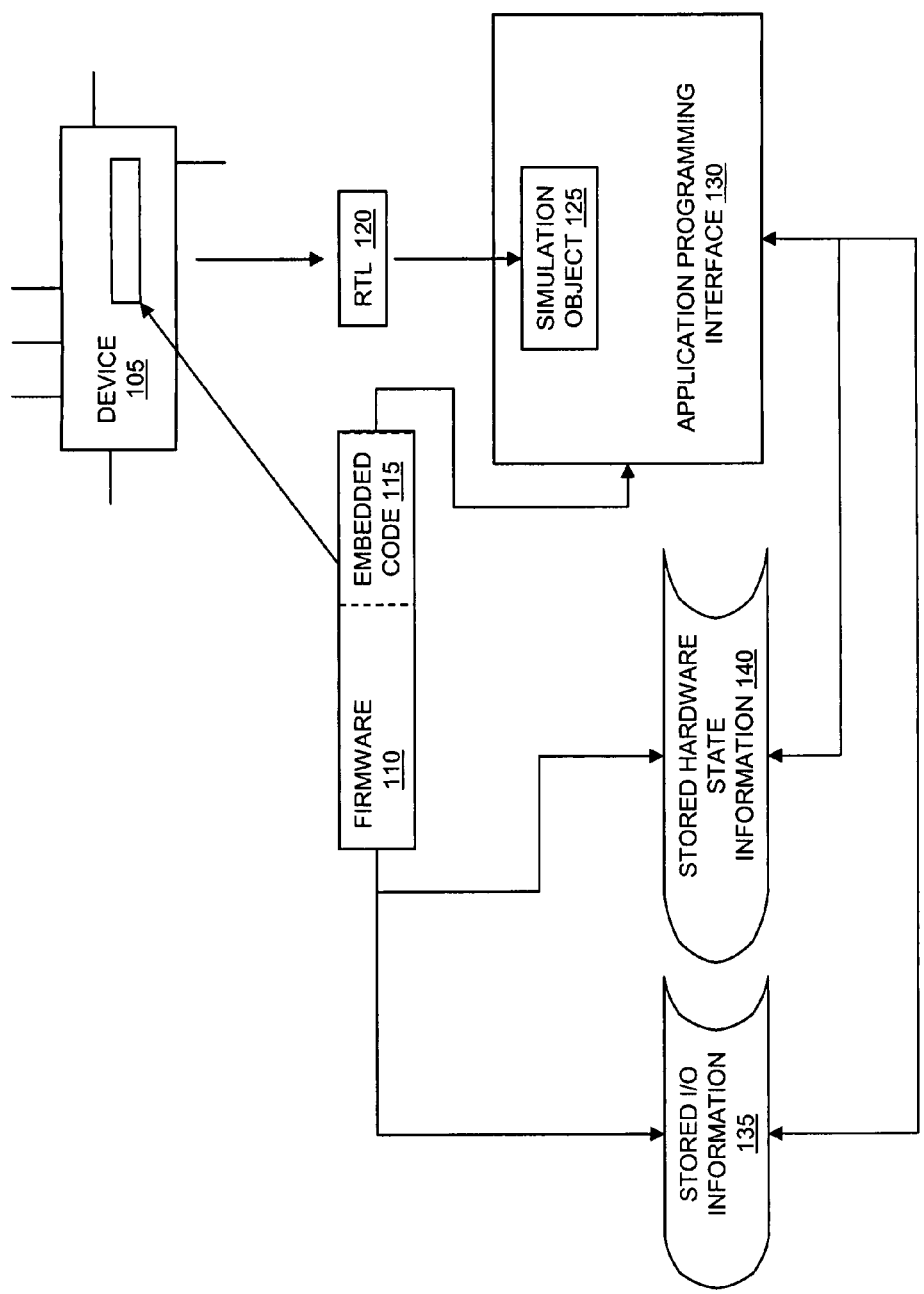
FIG. 1 is a block diagram of a system for debugging software using stored I/O information and hardware state information in accordance with one embodiment of the invention.

Refer first to FIG. 1. Modem computing devices 105 typically comprise both hardware (e.g., circuitry) and software embedded directly on the device 110 (e.g., system software, or "firmware") that may be inserted into programmable read-only memory (programmable ROM), thus becoming a permanent part of a computing device. In some implementations, the firmware may include additional software components 115 that do not interact directly with the device 105, but may be used to interact with other devices. When a designing hardware device 105, it is common for hardware designers to first describe the device 105 in terms of a hardware-description language, e.g., as a Verilog register-transfer level (RTL) file 120 (it being understood that the invention is compatible with essentially any hardware description or hardware-description language). The electronic device 105 may be, for example, an electronic chip, a small functional block of a chip, numerous chips that make up a complete system, or any other combination of electronic components. The RTL description 120 represents a complete functional characterization of the device 105, specifying the registers of the device and the manner in which data is transferred among them; this representation is preferable, for performance purposes, to a lower-level (e.g., gate level) description. Interconnections within the hardware may be represented as vectors, rather than requiring each wire of, for example, a wide bus to be defined explicitly. In any case, the description contains sufficient detail to permit a software-based simulation of the system to be generated, and the description is processed by a compiler into a software simulation object 125. This object may be used to simulate the operation of the actual device 105 in order, for example, to facilitate development and testing of system software 110 that will be used with the device before it is physically available.

For example, suppose the hardware 105 being simulated is a network interface designed for use on a computer that supports a PCI bus interface, a USB port interface, and a PCMCIA interface. In this case, the simulation object 125 will simulate the functionality of all of these interfaces, and may be used in conjunction with, for example, interface drivers that interact with the chip. Testing the system software 110 involves applying to the object 125 software representations of the data signals that would be applied to the terminals of the physical device. The simulation object 125, in turn, not only responds with data representative of the output signals that the device 105 would generate, but also maintains an internal representation of the register operations underlying the device output. These may be provided back to the system software 110 and analyzed to investigate the behavior of the system software 110 with respect to its interactions with the device 105, thereby facilitating identification of potential design problems with the system software 110, the hardware design 105, or both.

In other words, software representations of the data signals that emanate from the system software 110 and that would be applied to the terminals of the device are provided to the object 125, which not only responds with data representative of the output signals that the device would generate, but also maintains an internal representation of the register operations underlying the device output. These may be analyzed to investigate device behavior and identify potential design problems, allowing simulation of the system software 110 to proceed in parallel with hardware development and thereby reducing overall time to market. In some embodiments, in addition to the system software 110, additional embedded code 115 (e.g., compiled C code or other software that runs simultaneously with the simulation object 125) may also be included as part of the overall design.

In some embodiments, the interactions between the system software and the software objects that represent the device 105 are implemented using an application programming interface (API) 130 that mediates between the internal object representation of the device 105 and the system software. The API 130 thereby provides an abstraction layer, translating the functionality into inputs, outputs, and clock cycles that are handled by the simulation object 125. For example, the simulation object 125 may operate cycle by cycle, whereas functions provided through the API 130 may involve multiple cycles or operate on a transactional level.

When verifying the system software 110, however, it is often necessary to re-execute the same or similar simulations of the software object with which it will interact to identify, understand and resolve problems. Often, such simulations may can be run dozens of times as the user hones in on a particular problem, bug or design flaw. As such, because software objects that model complex electronic devices are themselves complex and may require a long time to execute, re-execution can become quite time-consuming. This is especially the case when the point of interest (e.g., a point at which a bug was detected or some other anomaly occurred) is far along the execution timeline. Indeed, the problem is even more acute when interacting with a cycle-accurate and RTL-accurate virtual hardware model (VHM).

In accordance with embodiments of the present invention, a "replayable model" can be created and used to accelerate the re-execution of the software object and its interaction with the system software using the API 130 and information stored during previous executions. A replayable model, as used herein, refers to a software representation of the hardware device that, based on recorded design stimuli and software states, responds in exactly the same way to the same design stimuli in the same environment, and detects any divergence in terms of the stimuli and/or the resulting output relative to an earlier executions while maintaining correct functionality and a high level of transparency. Specifically, model I/O information 135 (such as VHM RTL pin values, c-model interface values, values of certain registers, etc.) and hardware state information 140 may be saved periodically during various executions of the software object 110, and then used during subsequent simulations to identify faults and provide restart information to accelerate the simulation process.

Figure 2:
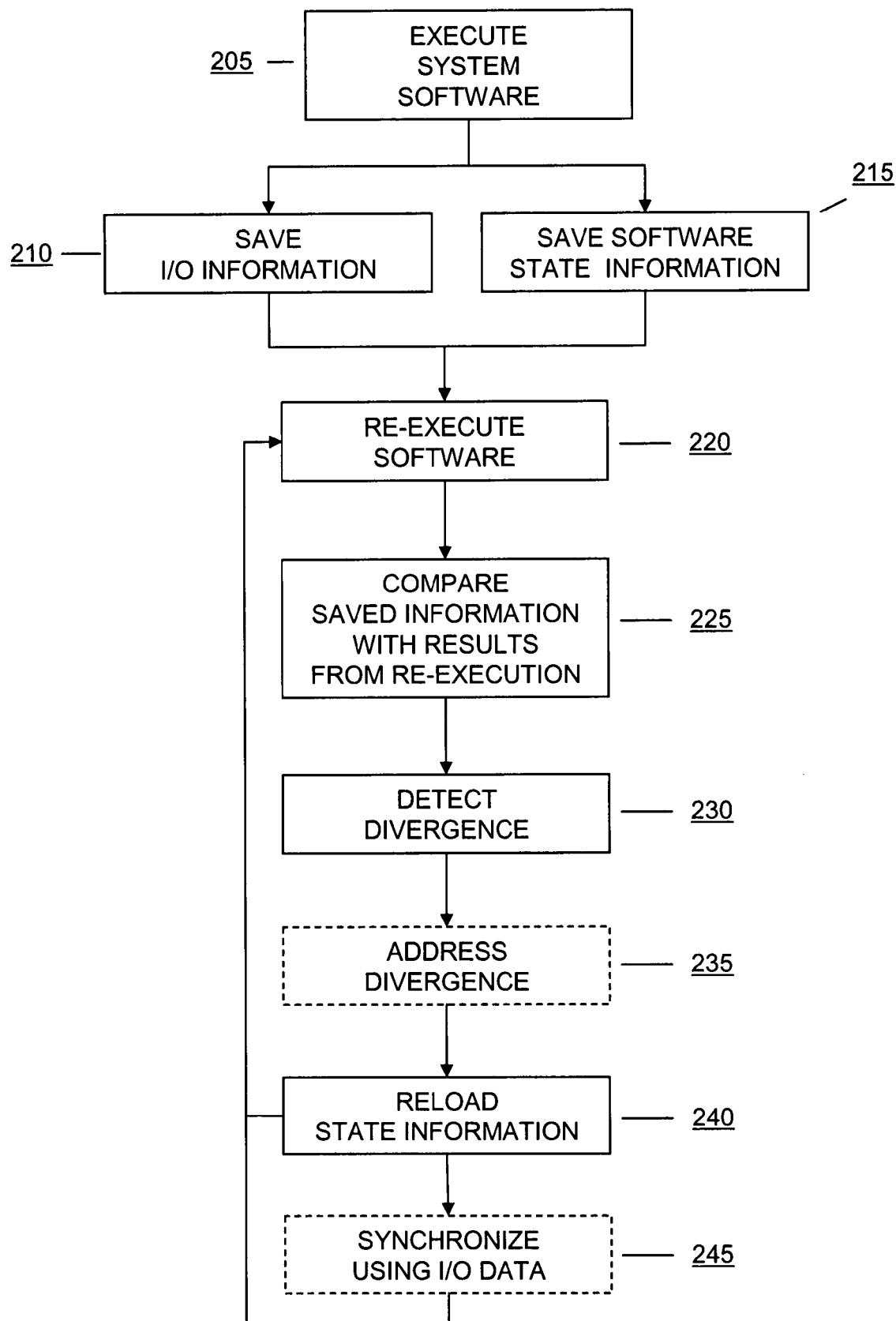
FIG. 2 is a flowchart depicting a method for debugging software in accordance with an embodiment of the invention.

In brief overview, FIG. 2 depicts a method for accelerating the execution of software during testing in accordance with an embodiment of the invention. Broadly, the method includes executing the software object (STEP 205) and periodically (e.g., every clock cycle or at every transaction) storing both I/O information (STEP 210) and hardware state information (STEP 215) as it interacts with the system software. (Hardware state information is sometimes also referred to as "checkpoint" information.) The software object can then be re-executed by replaying the stored I/O information (STEP 220), during which the I/O information is compared to observed I/O information (STEP 225) received from the system software. At some point during the playback, a divergence may be detected (STEP 230), for example, between the stored inputs and inputs generated by the system software during the replay of the software object. Optionally, the cause of the divergence may be addressed and corrected (STEP 235), at which point the software object may be re-executed. But instead of re-executing the software object from its initial state, saved I/O data and saved state information can be loaded (STEP 240), thus simulating execution of the software object from a previously saved state (typically, but not necessarily the most recently saved state) to the point of divergence and bringing the software object forward along its execution path as if it had been executing up to the checkpoint. As a result, there is no need to actually execute the software object from its initial state to the checkpoint at which the state information was loaded, significantly accelerating the execution process.

In some instances, the divergence may occur at a checkpoint, in which case loading the state information saved at that checkpoint is typically sufficient, for debugging purposes, to place the software object in the proper state for continued execution. However, in some cases, the divergence may occur between two checkpoints, and as a result, state information alone cannot bring the software object to the point where execution can resume. In such cases, replaying the stored I/O data (STEP 245) from the checkpoint up to the point of divergence permits the software object to resume execution from the divergence point forward.

Figure 3:
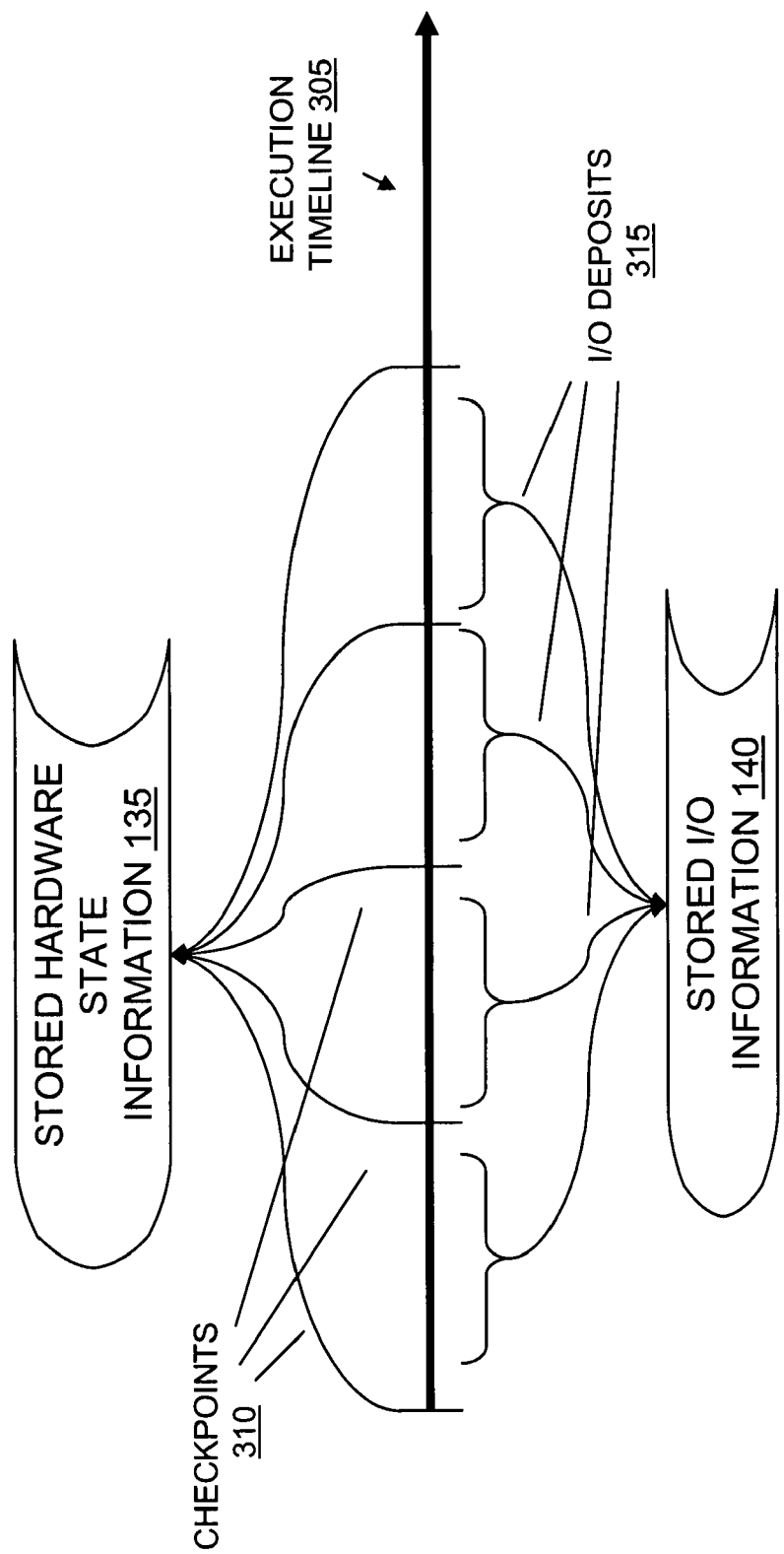
FIG. 3 is an illustration of the recording of I/O information and hardware state information during execution of software in accordance with one embodiment of the invention.

Referring to FIG. 3, a process for storing I/O information 140 and hardware state information 140 is illustrated in greater detail. Execution of the software object 110 can be represented by an execution timeline 305 that generally flows forward as the software object executes though each cycle. At some periodicity, the hardware state information 140—which represents the state of the software model of the hardware device at the checkpoints 310—is stored to a file or other memory device. The checkpoints 310 may occur at a fixed periodicity (e.g., every 1000 clock cycles) and the state of each element of the software object at each checkpoint 310 is stored. In addition, I/O information 130 representing, for example, interactions between hardware components (either actual or simulated) and system software 110 such as pin deposits, etc. may be stored throughout the execution of the software object (e.g., at each clock cycle or at some greater frequency than the rate at which state information 135 is stored or at the rate with which higher-level transactions are applied to the hardware device). The I/O information 130 and state information 135 may be stored in a common file, or, in some cases, separate files.

Suppose, for example, that the software 110 is firmware that is to be loaded onto a hand-held calculator for transferring data from the calculator's memory to a communications port. The simulation object, meanwhile, emulates the actual calculator device, having, for example, functions for adding, subtracting, multiplying and dividing. To emulate actual system behavior, the software object 125 models the steps performed by a real calculator, such as placing the inputs into physical registers within the system and performing a binary addition on the registers, and thereupon placing the resulting values on a data bus to facilitate display and/or further processing. In the context of the invention, the system software 110 interacts with the physical elements of the device to read data to and/or write data from registers in the device. For example, different states of the system software may include an initial state (no inputs present), a result state (the result value on the data bus) and a display state. The I/O information may include a more granular representation of the process, such as receipt of the inputs from an I/O device (e.g., a keyboard), placement of the inputs at physical registers, any intermediate pin deposits, placement of the result on the data bus, and display. The combination of stored software states and I/O data may then be "replayed" to simulate the execution of the software without having to execute the software in its entirety.

Figure 4:
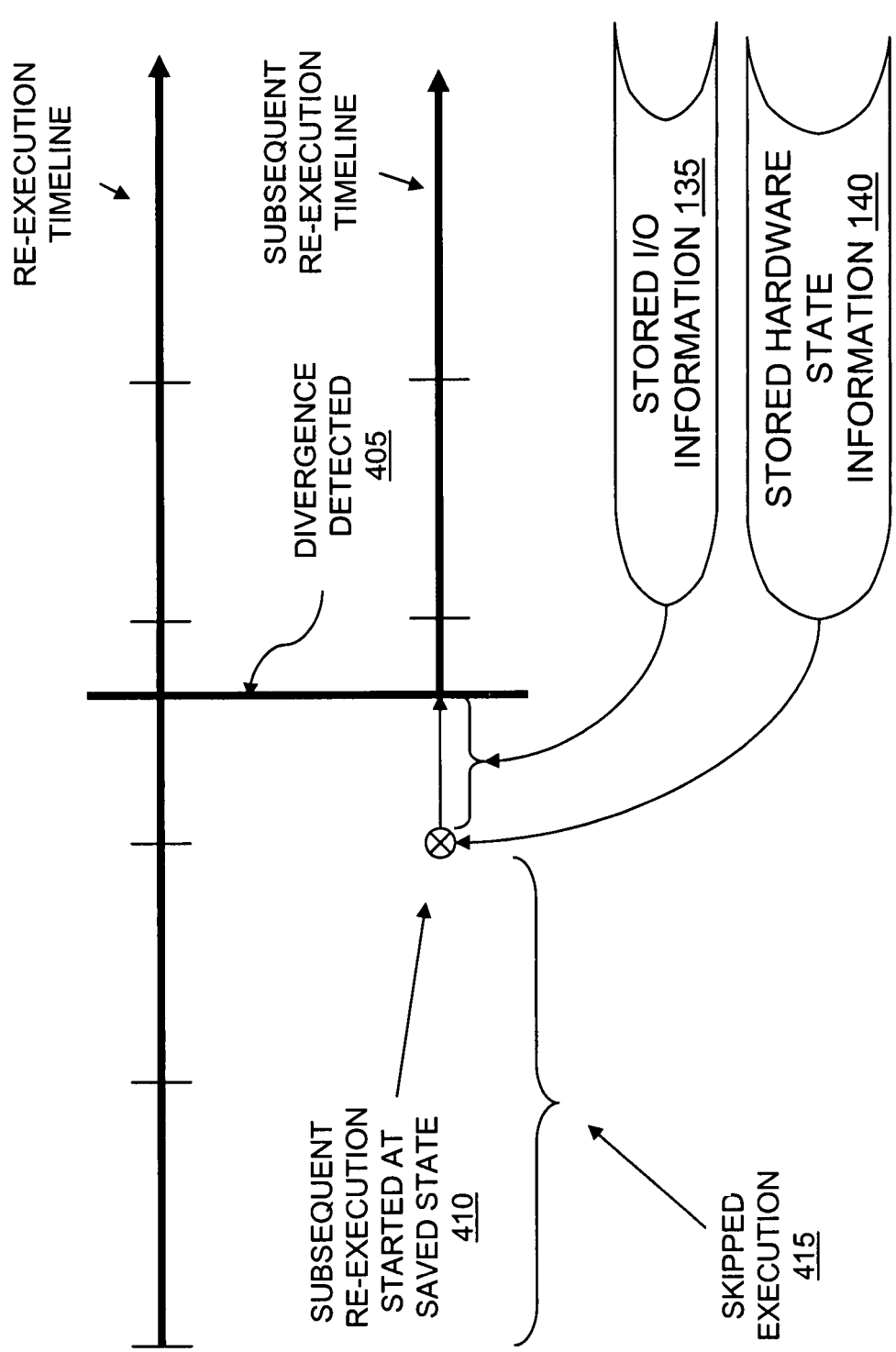
FIG. 4 illustrates a subsequent re-execution of the software using the saved I/O information and hardware state information of FIG. 3 in accordance with one embodiment of the invention.

FIG. 4 illustrates a subsequent re-execution of the software object using the stored I/O information 135, stored state information 140 after detection of a divergence 405 between the stored data and a previous execution. Specifically, execution of the simulation object 125 may be rolled back to a previous checkpoint 410 using the saved hardware state information 140, and brought forward using the stored I/O information 135 from the checkpoint to the point of divergence 405, at which point the simulation resumes execution without having to execute certain portions of the simulation 415.

Figure 5:
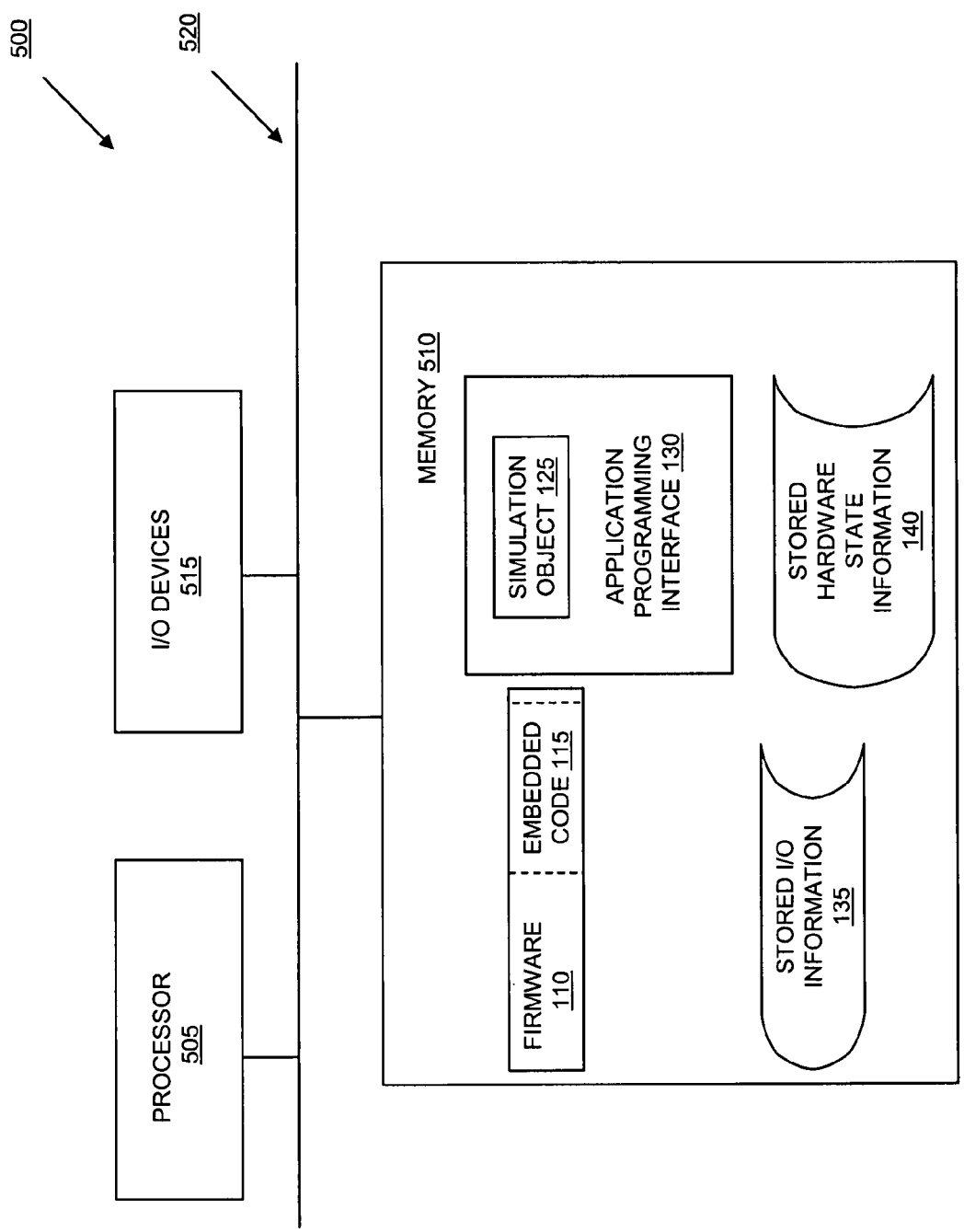
FIG. 5 is a block diagram of a general-purpose computer on which embodiments of the invention may be implemented.

The functionality of the systems and methods described above may be implemented as software on a general purpose computer, such as a general purpose computer 500, as shown in FIG. 5. The general purpose computer 500 includes a processor 505, a memory 510, and I/O devices 515. The processor 505, the memory 510, and the I/O devices 515 are interconnected by a bus 520.

The processor 505 executes instructions that cause the processor 505 to perform the functions dictated by the instructions. These instructions are typically read from the memory 510. In some embodiments, the processor 505 may be a microprocessor, such as an Intel 80×86 microprocessor, a PowerPC microprocessor, or other suitable microprocessor.

The I/O (input/output) devices 515 may include a variety of input and output devices, such as a graphical display, a keyboard, a mouse, a printer, magnetic and optical disk drives, network interface, or any other input or output device that may by connected to a computer. The I/O devices 515 may permit instructions and data to be transferred from various computer readable media, such as floppy disks, hard disks, or optical disks into the memory 510.

The memory 510 may be random access memory (RAM), read-only memory (ROM), flash memory, or other types of memory, or any combination of various types of memory (e.g., the memory 510 may include both ROM and RAM). The memory 510 stores instructions which may be executed by the processor 505, as well as data that may be used during the execution of such instructions. In particular, in some embodiments, the memory 510 includes instructions that implement the API 130, which is configured to save I/O data 135 and hardware state information 140 for use during subsequent executions of the system software 110. API 130 may be straightforwardly realized in accordance with the descriptions of its functionality set forth above.

The software implementing these modules may be written in any one of a number of high-level languages, such as C, C++, C#, LISP, or Java. Further, portions of the software may be written as script, macro, or functionality embedded in commercially or freely available software. Additionally, the software could be implemented in an assembly language directed to a microprocessor used in the general purpose computer 700, such as an Intel 80×86, Sun SPARC, or PowerPC microprocessor. The software may be embedded on an article of manufacture including, but not limited to, a "computer-readable medium" such as a floppy disk, a hard disk, an optical disk, a magnetic tape, a PROM, an EPROM, or CD-ROM.

It will be understood that the general purpose computer 500 is for illustrative purposes only, and that there are many alternative designs of general purpose computers on which software implementing the methods of the invention can be used.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for debugging hardware-related software, wherein the hardware-related software comprises simulated modules and non-simulated modules, the method comprising the steps of:

during a first execution of the hardware-related software while the non-simulated modules are executed in parallel with the simulation of the simulated modules, periodically saving to a file (i) input/output information comprising hardware stimuli and responses resulting from processing the hardware stimuli and (ii) hardware state information;

re-executing the software until a divergence is detected between the saved hardware stimuli and stimuli presented during the re-execution;

halting the execution of the non-simulated modules at a point at which the divergence is detected;

waiting until the simulated modules are synchronized with the point at which the divergence is detected;

reinstating the execution of the non-simulated modules in parallel with the execution of the simulated modules;

using the saved input/output information and hardware state information, initiating a subsequent re-execution of the hardware-related software starting at an intermediate execution point prior to where the divergence was detected; and debugging the hardware-related software based at least in part based on the subsequent re-execution.

2. The method of claim 1 wherein the re-execution of the hardware-related software occurs subsequent to an alteration to the hardware-related software.

3. The method of claim 1 wherein the input/output information is saved at a frequency greater than a frequency at which the hardware state information is saved.

4. The method of claim 1 wherein the hardware-related software executes according to execution cycles corresponding to a clock phase, and the input/output information is saved at each execution cycle.

5. The method of claim 4 wherein the hardware state information is saved every n cycles, where n is an integer greater than 1.

6. The method of claim 5 wherein the integer n is configurable.

7. The method of claim 1 wherein the hardware-related software executes according to transactions, and the input/output information is saved at the completion of each transaction.

8. The method of claim 1 wherein the hardware-related software interacts with a coded representation of a hardware device.

9. The method of claim 1 wherein the input/output information comprises register transfer level pin values of a virtual hardware model.

10. The method of claim 1 wherein the simulated modules comprise register transfer level modules.

11. The method of claim 1 wherein the non-simulated modules comprise compiled object code.

12. A computer program product embodied on a computer-readable medium and comprising computer code for facilitating debugging hardware-related software, wherein the hardware-related software comprises simulated modules and non-simulated modules, the code comprising instructions for:
   during a first execution of the hardware-related software while the non-simulated modules are executed in parallel with the simulation of the simulated modules, periodically saving to a file (i) input/output information comprising hardware stimuli and outputs resulting from processing the hardware stimuli and (ii) hardware state information;
   re-executing the hardware-related software until a divergence is detected between the saved hardware stimuli and stimuli presented during the re-execution;
   halting the execution of the non-simulated modules at a point at which the divergence is detected;
   waiting until the simulated modules are synchronized with the point at which the divergence is detected;
   reinstating the execution of the non-simulated modules in parallel with the execution of the simulated modules;
   using the saved input/output information and hardware state information, initiating a subsequent re-execution of the hardware starting at an execution point prior to where the divergence was detected; and
   debugging the hardware-related software based at least in part based on the subsequent re-execution.

13. The computer program product of claim 12 further comprising instructions for saving the input/output information at a frequency greater than a frequency at which the hardware state information is saved.

14. The computer program product of claim 12 wherein the hardware-related software executes according to execution cycles corresponding to clock phases, and further comprising instructions to save the input/output information at each execution cycle.

15. The computer program product of claim 12 wherein the hardware-related software executes according to execution cycles corresponding to clock phases, and further comprising instructions to save the hardware state information every n cycles, where n is an integer greater than 1.

16. The computer program product of claim 15 further comprising instructions to modify the integer n.

17. A system for facilitating debugging hardware-related software, wherein the hardware-related software comprises simulated modules and non-simulated modules, the system comprising:
   a storage device for storing input/output information comprising hardware stimuli and outputs resulting from processing the hardware stimuli and hardware state information;
   an application programming interface for:
      (i) periodically saving the input/output information and the hardware state information during executions of the hardware-related software while the non-simulated modules are executed in parallel with the simulation of the simulated modules;
      (ii) detecting a divergence between the saved hardware stimuli and stimuli presented during a re-execution of the hardware-related software;
      (iii) halting the execution of the non-simulated modules at a point at which the divergence is detected;
      (iv) waiting until the simulated modules are synchronized with the point at which the divergence is detected;
      (v) reinstating the execution of the non-simulated modules in parallel with the execution of the simulated modules;
      (vi) initiating a subsequent re-execution of the hardware starting at an execution point prior to where the divergence was detected using the saved input/output information and hardware state information; and
      (vii) debugging the hardware-related software based at least in part based on the subsequent re-execution.

* * * * *